April 8, 1947.   G. E. LEWIS   2,418,781
WELDING ELECTRODE
Filed July 17, 1944

*INVENTOR.*
GEORGE E. LEWIS
BY
*Whittemore Hulbert & Belknap*
ATTORNEYS

Patented Apr. 8, 1947

2,418,781

UNITED STATES PATENT OFFICE 2,418,781

WELDING ELECTRODE

George E. Lewis, Detroit, Mich.

Application July 17, 1944, Serial No. 545,276

2 Claims. (Cl. 219—4)

The invention relates to welding electrodes of that type used for resistance welding and which are provided with replaceable tips.

It is the object of the invention to provide means for easily and quickly removing the tip whenever replacement is necessary thereby avoiding loss of time in the operation of the machine. To this end the invention consists in the construction as hereinafter set forth.

Welding electrodes of the type above referred to are provided with replaceable tips which usually engage tapered sockets in the body portion of the electrode. To hold down the temperature of the tip during operation, it is usual to form the electrode hollow so that a fluid cooling medium may be circulated therethrough. It is also usual to extend the passage for the fluid medium into the tip to more directly cool the same. However, other methods of dissipating the heat from the tip have been employed, such as the circulation of a refrigerating medium through the body of the electrode in which case the tips are sometimes made solid. During the operation of welding the pressure exerted against the tip tends to drive the same into the tapered socket so that great difficulty is frequently experienced in removing the tip from its socket. Tips when removed without injury thereto can sometimes be reconditioned for further use but, if the tip adheres to the socket, it is generally so distorted during removal as to be unfit for reconditioning. Furthermore, during the interval in which the tip is being removed, the welding machine is out of operation and, consequently, the working capacity of the machine will be increased by anything that will expedite removal and replacement of tips.

Figure 1:
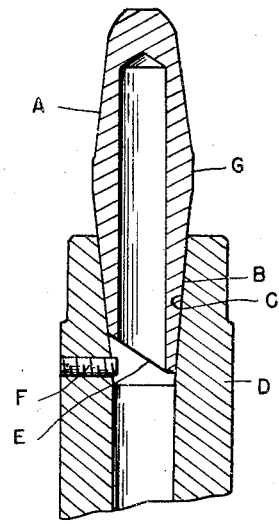
Fig. 1 is a longitudinal section through a portion of a welding electrode showing the replaceable tip and the socket with which it is engaged.
Figure 2:
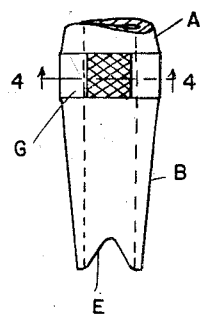
Fig. 2 is an elevation of the tip.
Figure 3:
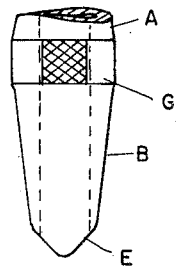
Fig. 3 is an elevation viewed at right angles to Fig. 2.
Figure 5:
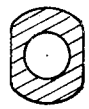
Figs. 5 and 6 are similar views showing slightly modified constructions.
Figure 4:
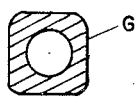
Fig. 4 is a cross section on line 4—4, Fig. 2.
Figure 6:

In view of the conditions just described I have devised a construction by which the tip may be very quickly removed from its socket and without injury thereto. This comprises essentially a cam at the inner end of the tip which will exert an axial pressure thereon in a direction to displace it from the socket. More specifically, the cam is formed as a part of the tip and a cooperating bearing is placed in the socket so that by rotating the tip the cam will engage the bearing and disengage the tip from the socket. As shown in Fig. 1, A is the tip which is hollow to form a chamber therein for the cooling medium. The inner end portion of this tip is tapered as indicated at B to engage a correspondingly tapered socket C in the body portion D of the electrode. At its inner end the tip is fashioned to form a cam E and the body D is provided with a pin F which extends radially through an aperture therein to project into operative relation to the cam. Outside of the socket the tip is fashioned to provide a wrench hold by means of which it may be rotated. Thus, as shown in Fig. 4, the portion G of the tip which is of largest diameter is squared. In Fig. 5 this portion is merely flattened on opposite sides and in Fig. 6 it has an octagonal form. However, any one of these constructions may be used for the engagement of a wrench or other tool by means of which the tip may be rotated within its socket. Such rotation will cause the cam E to bear against the abutment F with an axial reaction which forces the tip out of the socket. With the construction described whenever it is necessary to exchange a tip, the operator can very quickly engage a tool with the wrench hold G and by imparting a slight rotation thereto will force the tapered portion B out of the socket C. Inasmuch as the tip is sometimes driven further into the socket by the pressure applied thereto, the bearing F is placed so that initially it is separated from the cam E but the throw of the cam is still sufficient to engage the bearing and force out the tip. The body member D is also preferably provided with a wrench hold for engagement with a suitable tool so as to facilitate holding the same when the tip is relatively rotated.

What I claim as my invention is:

1. In a welding electrode, the combination with a holder having a socket therein, of a replaceable tip having a portion engaging said socket, the inner end of said portion being fashioned to form a cam operable upon the rotation of said tip, and a bearing in said socket cooperating with said cam when said tip is rotated to force the latter axially outward from its socket.

2. In a welding electrode the combination with a holder having a socket therein of a replaceable tip having a portion engaging said socket, a cam and a bearing within said socket, one on said tip and the other on said socket, adapted to cooperate when said tip is rotated to force it axially outward from said socket.

GEORGE E. LEWIS.

REFERENCES CITED

The following references are of record in the file of this patent:

UNITED STATES PATENTS

| Number | Name | Date |
|---|---|---|
| 894,250 | Woods | July 28, 1908 |
| 2,051,284 | Ball | Aug. 18, 1936 |
| 2,215,289 | Hensel et al. | Sept. 17, 1940 |
| 2,271,119 | Cox et al. | Jan. 27, 1942 |

FOREIGN PATENTS

| Number | Country | Date |
|---|---|---|
| 26,810 | British | Nov. 18, 1909 |